United States Patent [19]
Conway

[11] 3,881,582
[45] May 6, 1975

[54] PUNCH PRESS CLUTCH AND BRAKE WITH PRESSURE BOOSTER

[75] Inventor: William A. Conway, Cincinnati, Ohio

[73] Assignee: Conway Clutch Company, Cincinnati, Ohio

[22] Filed: Aug. 13, 1973

[21] Appl. No.: 388,031

[52] U.S. Cl. .......................... 192/12 C; 188/250 G
[51] Int. Cl. ................................................ F16d 67/04
[58] Field of Search ...................... 192/12 C, 18 A

[56] References Cited
UNITED STATES PATENTS

| | | | |
|---|---|---|---|
| 2,538,997 | 1/1951 | Weiland | 192/85 AT |
| 2,559,195 | 7/1951 | May | 192/12 C X |
| 2,771,790 | 11/1956 | Munschauer | 192/12 C X |
| 2,794,523 | 6/1957 | Cortelli et al. | 192/12 C X |
| 3,159,247 | 12/1964 | Charlton | 192/12 C X |
| 3,509,976 | 5/1970 | Coon | 192/12 C X |

Primary Examiner—Benjamin W. Wyche
Attorney, Agent, or Firm—Wood, Herron & Evans

[57] ABSTRACT

A punch press has a fail-safe brake operable to continuously brake the punch until the press is deliberately actuated. A hydraulically deactivated spring applied brake assembly is utilized to brake a disk attached to a cam shaft which drives the punch. The spring members of the assembly normally engaged the brake, pneumatically controlled hydraulic pressure (via a pneumatic-hydraulic booster) being utilized to release and disengage the brake. A pneumatically actuated clutch selectively connects the cam shaft to a driving means to actuate the punch. The pneumatic clutch and brake controls are connected to a common source of pneumatic pressure so that the brake can be disengaged only when the clutch is deliberately actuated. The brake remains engaged despite pneumatic or hydraulic system failures.

10 Claims, 5 Drawing Figures

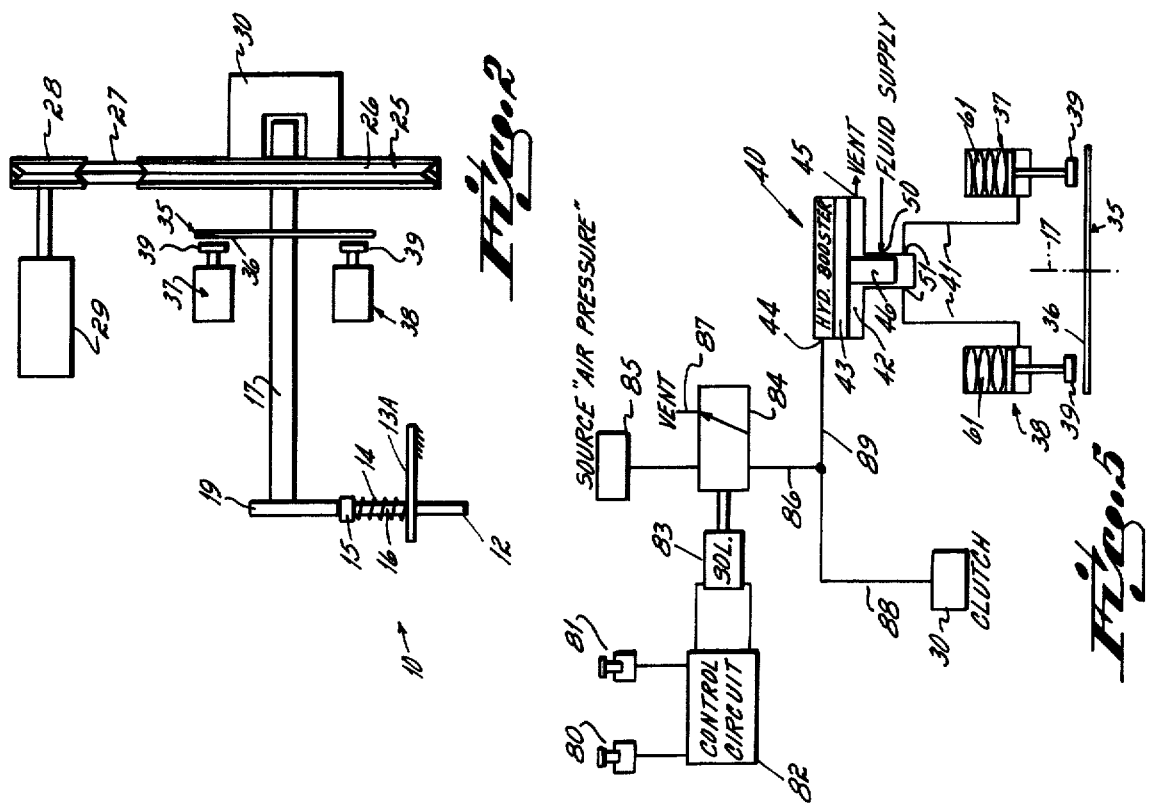
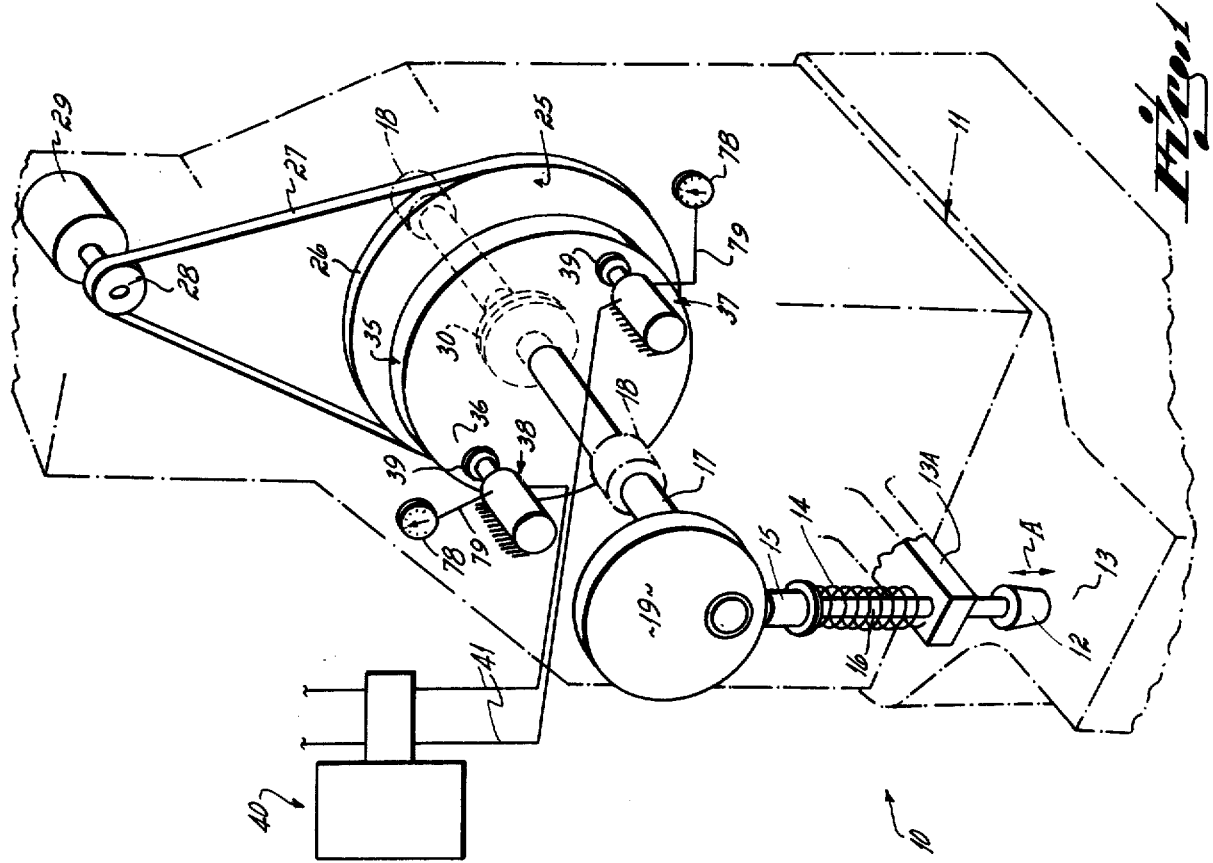

PUNCH PRESS CLUTCH AND BRAKE WITH PRESSURE BOOSTER

This invention relates to punch press apparatus and particularly to fail-safe braking apparatus for braking the punch.

Punch presses of the type upon which the present invention is an improvement are commonly known. Such presses typically include a frame, a driving motor mounted on the frame, a flywheel rotationally mounted on an axial cam shaft journaled in the frame, a driving belt connecting the motor to the flywheel, a cam on the cam shaft, a punch element disposed to be reciprocally driven by the cam and a clutch for selectively connecting the motor driven flywheel to the cam shaft in order to drive the punch.

In operation, the clutch is engaged and the motor, together with the inertia in the constantly driven flywheel, drives the punch element through a workpiece. Since the workpieces are typically hand-positioned in a working area near the punch element, it is desirable to provide safety features in the press to minimize injury to persons operating the press. In fact, the Federal Government, through the O.S.H.A. has required that certain safety standards be maintained in such apparatus.

For maximum safety, it is desirable to provide a control mechanism which must be operated with both hands. The control mechanism is located in a safe position and thereby insures that the hands are in a safe position during press operation. I have also found it to be desirable to provide a brake for the press such that at least the punch element is positively braked until the press is deliberately actuated via the control mechanism.

It has thus been one objective of the invention to provide a punch press having an interrelated driving clutch and braking means for positively controlling the operation of the punching element of the press at all times.

A further objective of the invention has been to provide an improved punch press having a fail-safe brake for selectively holding the press punch element motionless.

A further objective of the invention has been to provide a punch press having a brake means normally engaged to prohibit punch motion at all times except when the punch driving clutch is deliberately engaged to drive the punch.

A further objective of the invention has been to provide a clutch means and a normally engaged brake means for a punch press together with a common actuating or control means for both the clutch and brake so that the brake can be disengaged only when the clutch is deliberately engaged via the control means.

A yet further objective of the invention has been to provide, in a punch press, a pneumatically controlled (for disengagement) spring applied brake capable of normally exerting preferably 1,500 to 2,000 pounds of braking pressure to brake a punch element and yet which, for disengagement, requires pneumatic pressure of approximately only 100 psi.

To the accomplishment of these and other objectives, a preferred embodiment of the invention includes a punch press of the type described above, modified to include a braking disk secured to the cam shaft, a pneumatically controlled spring applied brake for engaging and stopping the disk, a pneumatic-hydraulic booster for the brake, and a pneumatic clutch. Pneumatic controls for the brake and clutch are interrelated so that the brake constantly engages and holds the disk against rotational movement except when the clutch is deliberately engaged to drive the punch.

The brake apparatus includes a spring applied brake normally engaging the braking disk with a braking force of between 1,500 to 2,000 pounds per square inch of brake-disk contact. Hydraulic pressure in a corresponding pressure range can be applied to disengage the brake at the same time pneumatic pressure is applied to the clutch to drive the punch. The hydraulic pressure is produced via a pneumatic-hydraulic booster so that a pneumatic pressure of approximately 100 psi is sufficient to cause the booster to produce the hydraulic pressure required to disengage the brake. Pneumatic pressure to engage the clutch and to operate the booster is provided through common valving and thus the brake always remains engaged except when the clutch is deliberately energized. Controls are provided so that they can be operated to engage the clutch only when both hands of an operator are in a safe position.

The invention thus provides a punch press having an interrelated fail-safe brake and driving clutch and driving clutch and in which safety is maximized by the fact that the brake is constantly engaged until the clutch is deliberately actuated to drive the punch. The brake remains engaged at all other times despite hydraulic or pneumatic failures in the system.

These and other advantages will become readily apparent from the following detailed description of a preferred embodiment and drawings in which:

FIG. 1 is a perspective view of a punch press according to the invention;

FIG. 2 is a diagrammatic side view of a punch press according to the invention;

FIG. 5 is a diagrammatic drawing of the clutch and brake control system of the invention.

Figure 3:
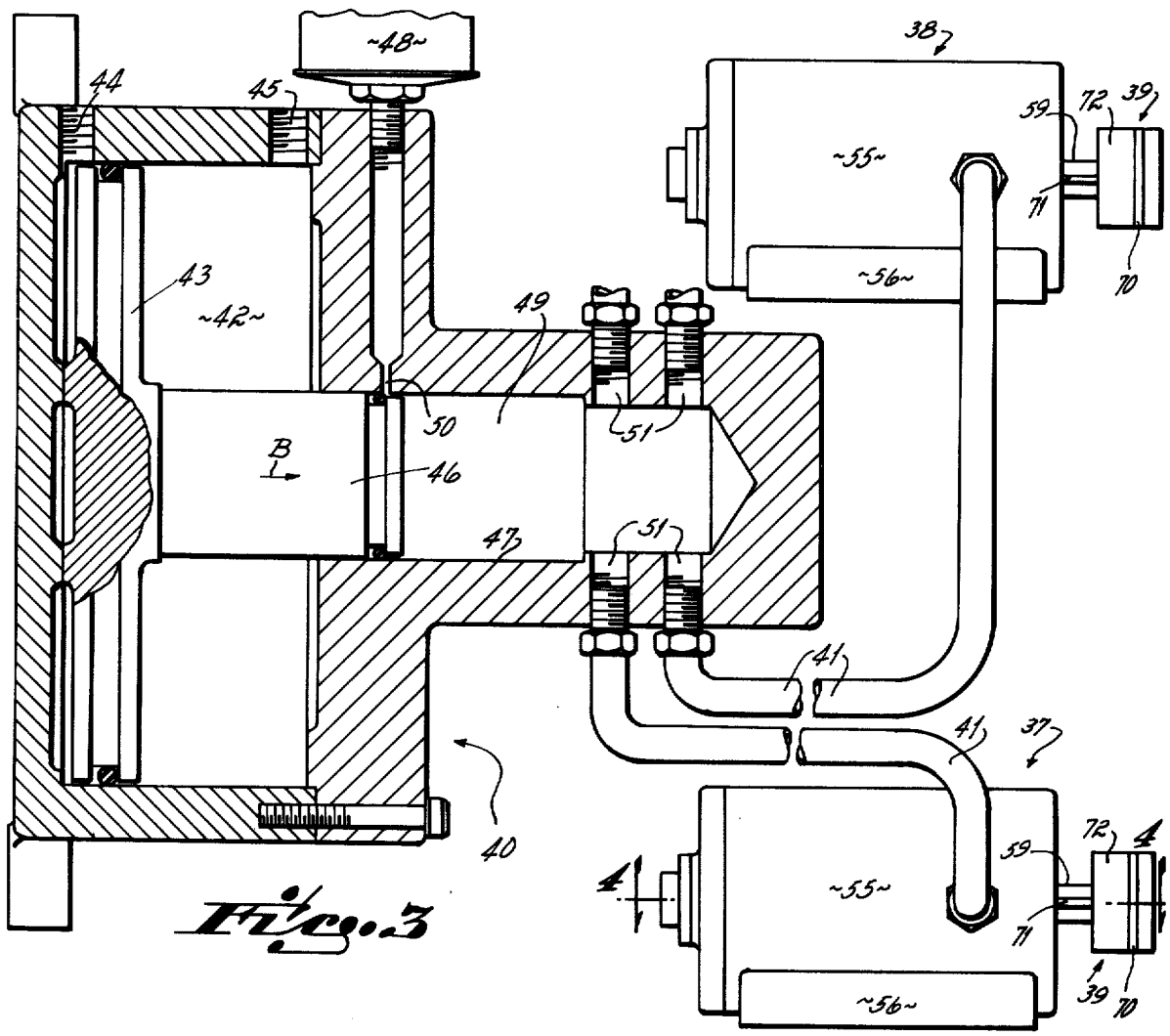
FIG. 3 is a cross-sectional view of a pneumatic-hydraulic booster and shows the booster connected to brake apparatus.

Referring now to the drawings, FIG. 1 depicts a punch press 10 according to the present invention. The press 10 includes a frame 11 constructed to support the various elements of the press 10. A punch element 12 is mounted for vertical movement in a member 13A of the frame 11 and, during operation, the punch 12 is reciprocated toward and away from a work area 13. When driven downwardly in a normal operation, the punch is operable to punch through a workpiece (not shown) positioned in work area 13. Spring 14 is disposed between the frame member 13A and an upper cam follower portion 15 of the punch shaft 16 so that the punch 12 is normally held in an upward direction removed from the workpiece in the work area 13.

A cam shaft 17 is rotationally mounted in appropriate bearings indicated at 18 in the frame 11 and a punch driving cam 19 is mounted proximate the near end of this shaft, so that it engages the cam follower portion 15 of the punch shaft 16. When the cam is rotated about the axis of the shaft 17, the punch shaft 16, and thus the punch 12, are driven in a reciprocating motion as can be appreciated.

The cam shaft 17 and the cam 19 are driven through a pulley-flywheel 25 which is secured to the cam shaft 17 intermediate its ends. The pulley-flywheel 25 has a predetermined mass and includes grooves 26 about its periphery for receiving one or more driving belts 27. The belts in turn are driven through a corresponding pulley 28 which is directly driven by an electric motor 29.

The pulley-flywheel 25 is rotationally mounted on the cam shaft 17 and a clutch 30 is connected between the cam shaft 17 and the pulley-flywheel 25 for selectively connecting the pulley to the shaft in order that the shaft might be rotated. The clutch 30 may comprise any suitable clutch known to the art, however, a clutch of the type manufactured by Conway Clutch Company and advertised and sold under the trademark "STATIONAIRE" has been found to be particularly suitable. The clutch 30 is pneumatically actuated to engage or connect the pulley flywheel to the cam shaft and its particular construction does not form part of this present invention, with the exception of the fact that it is pneumatically operated to engage.

From the foregoing description, it can be appreciated that during a punching operation the electric motor is energized to continuously drive the pulley-flywheel 25. In order to drive the punch, the clutch is pneumatically actuated to connect the pulley-flywheel to the cam shaft 17. When this connection is made, the cam 19 is rotated and serves to drive the punch 12 in a reciprocating manner. It will also be appreciated that the pulley-flywheel 25 also acts as a flywheel so that the inertia of the continuously moving pulley-flywheel serves, together with the electric motor, to drive the punch 12 through a workpiece.

In order to positively secure the cam shaft 17 against rotation, and therefore to brake the punch 12, a braking disk 35 is secured to the cam shaft 17 in a suitable position such as between the pulley-flywheel 25 and the cam 19. The brake disk 35 may be welded to cam shaft 17 or otherwise secured thereto and comprises a flat circular disk having a braking surface 36.

As shown in FIG. 1, two brake assemblies 37, 38 are disposed proximate the brake disk 35 such that braking pads 39 on the assemblies can frictionally engage such that brake disk in order to stop and hold the disk 35, the shaft 17, and the cam 19 stationary. Brake assemblies 37 and 38 are mounted on a stationary portion of the frame 11 in any suitable manner, the particular details of the mounting not being shown in FIG. 1.

The particular brake assembly utilized in the embodiment shown in the drawings is best described as a pneumatically controlled, hydraulically deactivated spring applied brake assembly of the type utilizing a series of spring units which are individually known in the trade as a "Bellville" spring. The spring unit is constructed to apply the braking pads 39 against the brake disk 35 and pneumatically controlled hydraulic pressure is utilized to compress the spring unit to release the brake pads 39 from engagement with the disks.

Figure 4:
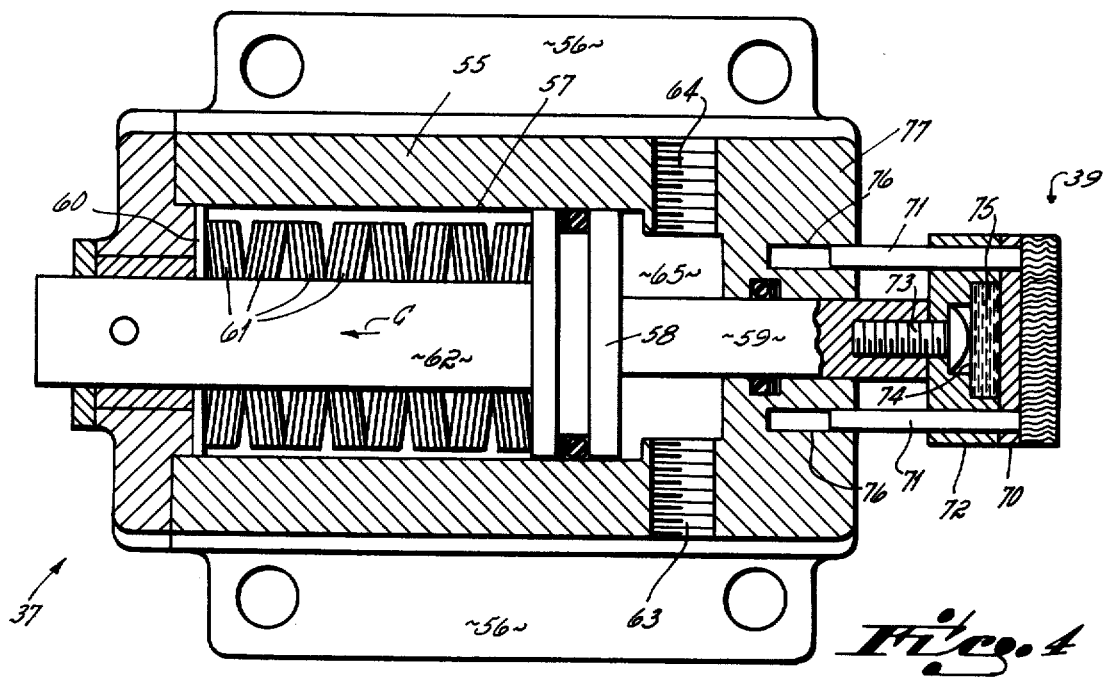
FIG. 4 is a cross-sectional view taken along lines 4—4 of FIG. 3.

Pertinent details of a preferred brake assembly are specifically shown in FIG. 4. Each brake assembly includes a body 55 having mounting flanges 56 by which the assembly can be positively secured to a stationary portion of the punch press. The body 55 includes members which define a bore 57 within the brake assembly. Disposed in the bore is a hydraulic piston 58 which is connected to a brake pad actuating shaft 59. A "Bellville" spring unit is also located in the bore 57 and is disposed between another side of the hydraulic piston 58 and a rearward end wall 60 of the bore 57. The spring unit, in a preferred embodiment, comprises eight sets 61 of dish or cup-shaped springs. Each set includes five separate spring members which nest together in a like manner with their convex dished or cupped portions directed toward the same axial direction. Adjacent sets however do not nest but rather are disposed as shown so that the individual outer spring members of each set contact an individual outer member of an adjacent set either at the outer edges thereof or at relatively internal convex portions thereof. It is well known that such spring units are capable of exerting relatively high forces and yet operate throughout a very short range of "throw."

In the particular embodiment shown, the springs have a central opening so that they can be mounted on a shaft 62 extending rearwardly from the piston 58. The individual spring members and the spring sets are selected so that the spring unit is capable of exerting a relatively high force upon the hydraulic piston. Specifically, the spring unit is selected so that the force which can be applied by the brake pad 39 to the braking surface 26 of the disk 35 is about 1,500 to 2,000 psi. The brake assembly 37 as shown in FIG. 4 also includes two bores 63 and 64. As shown in FIG. 3, it can be appreciated that the bore 63 is connected to a high pressure hydraulic line extending from a high pressure hydraulic chamber of a pneumatic-hydraulic booster as will be described. The application of sufficient hydraulic pressure through the bore 63 pressurizes chamber 65 in the brake assembly 37 and urges the piston 58 rearwardly (arrow C) against the bias of the spring unit.

The brake assembly further includes the braking pad 39 which is mounted on a forward end of the shaft 59 via a backing plate 70. The plate 70 is made from a material which can be magnetically attracted. Pins 71 are secured to the backing member 70 and extend through appropriate holes bored through a brake pad mounting member 72, into bores 76 in walls 77 of the assembly. These pins keep the backing member 70 and pad 39 from sliding with respect to the pad mounting member.

The pad mounting member 72 is secured to the shaft 59 by way of a screw 73 and includes a pocket 74 to receive a magnet 75. The construction of the forward end of the brake assembly including the pad, its backing member 70, the pins 71, and the pad mounting member 72 enables the brake pads to be changed very quickly by merely pulling them forwardly against the magnetic force applied by a magnet 75.

In order to provide an indication of the pressure needed to compress the Bellville spring unit, a gauge, indicated diagrammatically at 78 in FIG. 1, may be connected to the pressure chamber 65 of each brake assembly via bores 64 and hydraulic lines 79.

For purposes of description, the complete braking means includes at least one pneumatically controlled hydraulically deactivated spring applied brake assembly connected via appropriate high pressure hydraulic lines 41 to a pneumatic-hydraulic booster 40.

Various details of the pneumatic-hydraulic booster apparatus 40 are best shown in FIG. 3. The apparatus includes a pneumatic piston chamber 42 housing a pneumatic piston 43. A bore 44 is provided at the rearward end of the chamber 43 and when pressurized air is introduced through the bore 44 into the chamber 42, piston 43 can be driven forwardly in the direction of arrow B, the forward portion of the chamber venting to a bore 45.

Connected to the pneumatic piston 43 is a hydraulic piston 46 disposed within a correspondingly shaped bore 47. Hydraulic fluid reservoir 48 communicates with a hydraulic chamber 49, defined by the bore 47, through a passage 50 and serves to apply hydraulic fluid to the hydraulic chamber 49 when the chamber is not pressurized. (When a forward end of the piston 46 is withdrawn as shown in FIG. 3)

A forward end of the hydraulic chamber 49 is provided with a plurality of outlets such as at 51. These outlets are connected through appropriate fittings and high pressure hydraulic lines 41 to the brake assemblies 37 and 38. It is to be appreciated that a varying number of brake assemblies can be utilized with the pneumatic-hydraulic booster apparatus. While only two brake assemblies are shown in the present embodiment, it is contemplated that at least 12 brake assemblies or even more could be utilized as a particular situation demanded. Thus, as many outlets 51 as there are brake assemblies can be provided from the hydraulic chamber 49.

The operation of the pneumatic-hydraulic booster will be readily understood by one of ordinary skill in the art. When pneumatic pressure is applied to the bore 44, piston 43 is driven forwardly, also driving the hydraulic piston 46 forwardly into the chamber 49 so as to pressurize the chamber in a known manner. In the preferred embodiment of the present invention, hydraulic pressure in the range of about 1,500 to 2,000 psi will be required in order to actuate the brake assembly.

It has been found that a pneumatic-hydraulic booster of the type described can be constructed to provide the relatively high pressures of approximately 1,500 to 2,000 psi on the hydraulic side of the booster by applying pressurized air at about only 100 psi on the pneumatic side of the booster. Pressurized air of this pressure is normally available in most installations where a punch press according to the invention would be used and thus the invention does not require the purchase of additional expensive high pressure hydraulic equipment.

From the above description, it can be appreciated that when the brake assemblies 37 and 38 are in position with respect to braking disks 35 and when the pneumatic pressure is applied through the bore 44 to the pneumatic-hydraulic booster, hydraulic pressure is applied to the hydraulic chamber 65 in the brake assemblies and the piston 58 is moved rearwardly in the direction of arrow C to retract the brake pad 39 from the braking disk 35. In this condition, the brake is released and the shaft 17 is free to turn. The normal position of the brake assemblies, however, is in an engaged condition so that the brake pads continually engage the braking disk 35 unless the brakes are deliberately disengaged.

The pneumatic-hydraulic booster is connected through a control unit so that pneumatic pressure is applied thereto only when the clutch 30 is pneumatically actuated. The controls for the clutch and for the brake are shown diagrammatically in FIG. 5. In FIG. 5, the controls have been actuated to energize the clutch and to release the brake pads 39 from the braking disk 35. The preferred control system utilizes two actuator buttons 80 and 81 which are spaced apart at a preselected distance so that they cannot be actuated by one hand of an operator but rather require both hands of an operator to push the buttons. These buttons are disposed in a relatively safe position with respect to the working area 13 and must be pushed simultaneously to actuate the press. In this manner, the apparatus insures that an operator cannot have his hand in the punching or work area 13 when the punch press is actuated to drive the punch through a workpiece.

The actuator buttons 80 and 81 are connected through appropriate control circuitry (shown only diagrammatically at 82) to an electric solenoid 83. Circuitry 82 is constructed so that the solenoid can only be energized if both buttons 80 and 81 are simultaneously pushed. The reciprocating arm of the solenoid is connected to a two-way pneumatic valve 84.

In the position as shown in FIG. 5, the pneumatic valve is operable to connect a source of air pressure 85 to a pneumatic line 86. In an alternate "off" or punch stopped position, the solenoid arm is retracted and the valve is operable to connect the line 86 to a vent 87 so that there is only normal ambient air pressure within the line 86.

The line 86 is connected through a common joint to the pneumatic lines 88 and 89. These lines are respectively connected to the clutch 30 and to the pneumatic pressure bore 44 of the pneumatic hydraulic booster. Thus, it can be seen from the diagrammatic view of FIG. 5 that the source of pressurized air can only be connected simultaneously both to the clutch and to the pneumatic hydraulic booster 40.

In FIG. 5, valve 84 has been moved to connect pressurized air to lines 88 and 89. The clutch is thus engaged and the booster is simultaneously actuated to provide hydraulic pressure to the brake assemblies 37 and 38, thereby withdrawing the pads 39 from the braking disk 35. In this condition, the press is free to operate, the inertia of the flywheel and the electric motor driving the shaft 17 and the punch 12 through a workpiece in the work area 13.

When one of the actuator buttons 80 or 81 is released, the solenoid is immediately actuated to move the pneumatic valve 84 to a position where it vents the pneumatic lines 86, 88 and 89. Accordingly, the clutch is de-energized for lack of pneumatic pressure applied thereto and the pneumatic-hydraulic booster is vented so that the hydraulic pressure in the booster chamber 49 is relieved. This relieves hydraulic pressure in the chambers 65 of the brake assemblies 37 and 38 and the spring sets 61 are thus free to flex and to move the brake pads 39 toward and into engagement with the braking disk 35.

It will thus be readily appreciated by those of ordinary skill in the art that the brake assemblies 37 and 38 are normally operable to maintain the braking pads 39 against the braking disk 35. The brake assemblies can only be actuated to release the braking engagement of the pad 39 with the disk 35 at the same time as the clutch 30 is pneumatically energized to connect the flywheel to the shaft 17. At all other times, and even in the event of pneumatic or hydraulic system failure, the braking disk is engaged by the pads 39 and the punch is effectively braked. Only by deliberate and effectively simultaneous actuation of the actuator buttons 80 and 81 can the solenoid 83 be energized to connect the hydraulic booster and the clutch to the source of air pressure to release the brake. The present invention thus provides a fail-safe brake in a punch press apparatus and thereby a large margin of safety for any operator of the punch press constructed according to the invention.

These and other advantages and modifications will become readily apparent to those of ordinary skill in the art without departing from the scope of the present invention and applicant intends to be bound only by the appended claims.

I claim:

1. In a punch press of the type including a driving motor, a flywheel connected to be driven by said motor, a punch, a cam shaft for driving the punch, and pneumatically actuated clutch means for selectively engaging said flywheel with said cam shaft in order to rotate the shaft and drive said punch when pressure air is supplied to said clutch, motion control apparatus comprising:

a braking disk positively secured to said cam shaft and including a braking surface on one side of said disk, a source of pressurized air, a pneumatic-hydraulic booster connected to said source of pressurized air and having an hydraulic output, hydraulically deactivated spring applied brakes hydraulically connected to said booster and disposed to normally engage the side braking surface of said braking disk on opposite sides of the cam shaft to stop said braking disk, said spring applied brakes having braking pads mounted to move toward and away from the braking surface in a direction parallel to the cam shaft on which the braking disk is mounted, said hydraulically deactivated spring applied brakes normally braking said disk but being operable to disengage from said disk, in a direction parallel to the cam shaft, when pressure air is applied to said booster to hydraulically deactivate said brakes, and means for selectively and commonly connecting said source of pressurized air to said pneumatically actuated clutch means and to said booster to engage said clutch and disengage said brake and for selectively and commonly venting said clutch means and booster to that said brake is engaged whenever said clutch is disengaged.

2. Apparatus as in claim 1 further including a solenoid controlled valve for alternately connecting pressure air to and venting said clutch means and said pneumatic-hydraulic booster, and means for controlling said solenoid including two normally open switches which must be simultaneously closed to actuate said solenoid to move said valve to simultaneously engage the clutch and disengage the brake.

3. Apparatus as in claim 1 wherein each of said hydraulically deactivated spring applied brakes includes, a brake body providing both a spring chamber having spring means therein and an hydraulic chamber, means hydraulically connecting the hydraulic output of said pneumatic-hydraulic booster to said hydraulic chamber, an hydraulic piston in said hydraulic chamber, said piston being spring biased by said spring means into said hydraulic chamber, a brake pad actuating shaft connected at one end to said hydraulic piston and extending through and outwardly of said hydraulic chamber, a brake pad mounting member connected to another end of said pad actuating shaft, a magnet mounted in said pad mounting member, a pad backing pad magnetically held on said pad mounting member by said magnet, and a brake pad connected to said pad backing plate.

4. Apparatus as in claim 3 wherein said brake body has a forward end member through which said pad actuating shaft extends, and further including, at least two holes in said forward end member, radially spaced from said actuating shaft and parallel thereto, at least two corresponding holes in said pad mounting member, said corresponding holes aligned with the holes in the forward end member, and at least two longitudinal pins mounted in said pad backing plate, said pins respectively extending rearwardly through said aligned respective holes in said pad mounting member and in said forward end member in order to positively locate and to hold said pad, said pad backing plate, and said pad mounting member against rotation.

5. Apparatus as in claim 3 further including an hydraulic pressure guage operably connected to the hydraulic chamber in each brake to monitor hydraulic pressure in the hydraulic chamber.

6. Apparatus as in claim 1 wherein said hydraulically deactivated spring applied brakes includes, a brake pad mounted on a backing member, a brake pad mounting member connected to a brake pad actuating shaft, and a magnet mounted on the mounting member, said magnet releaseably and magnetically holding said pad and said backing member on said pad mounting member.

7. Apparatus as in claim 6 wherein said hydraulically deactivated spring applied brake has a forward end member and further including pins connected to said backing member and extending rearwardly through said pad mounting member and into said forward end member.

8. Apparatus as in claim 1 wherein said pneumatic hydraulic booster comprises a pneumatic chamber having a predetermined diameter, a pneumatic piston in said chamber, said piston having a predetermined working surface area, a pneumatic port in a rearward portion of a chamber connected to said source of pressurized air, a vent port in a forward port of the chamber, a hydraulic chamber extending forwardly of said pneumatic chamber and having a diameter less than that of said pneumatic chamber, an hydraulic piston connected to said pneumatic piston and extending therefrom forwardly into said hydraulic chamber, said hydraulic piston having a predetermined working surface area less than the working surface area of said pneumatic piston, an hydraulic fluid reservoir connected to a rearward portion of said hydraulic chamber to supply fluid thereto when said hydraulic piston is retracted, hydraulic ports in a forward portion of said hydraulic chamber, said hydraulic ports being connected to said brakes to apply a predetermined hydraulic deactivating pressure thereto when a lesser pneumatic pressure is applied to said pneumatic piston through said pneumatic port.

9. Apparatus as in claim 8 wherein said hydraulic pressure is in the approximate range of 1,500 to 2,000 pounds per square inch, and said pneumatic pressure is approximately 100 pounds per square inch.

10. In a punch press, fail-safe apparatus for driving and for braking a punch including, a cam shaft for driving said punch, driving means for rotating said cam shaft, a source of pressurized air, pneumatic clutch means for connecting said driving means to said cam shaft when pressure air is supplied to said clutch, a braking disk positively mounted on said cam shaft independent of said pneumatic clutch means, at least one side of said disk providing a braking surface, a pneumatic-hydraulic booster connected to said source of pressurizied air, a pair of hydraulically deactivated spring applied brakes hydraulically connected to said booster and disposed to normally engage the side braking surface of said braking disk on opposite sides of the cam shaft to stop said braking disk, said spring applied brakes having braking pads mounted to move toward and away from the braking surface in a direction parallel to the cam shaft on which the braking disk in mounted, said hydraulically deactivated spring applied brakes normally braking said disk but being operable to disengage from said disk, in a direction parallel to the cam shaft, when pressure air is applied to said booster to hydraulically deactivate said brakes, and means for selectively and commonly connecting said source of pressurized air to said pneumatic clutch means and to said booster to engage said clutch and disengage said brake and for selectively and commonly venting said clutch means and said booster so that said brake is engaged whenever said clutch is disengaged.

* * * * *